United States Patent

[11] 3,571,513

[72] Inventors Ronald C. Ward;
Daniel C. Perry, Salt Lake City, Utah
[21] Appl. No. 809,343
[22] Filed Mar. 21, 1969
[45] Patented Mar. 16, 1971
[73] Assignee Telemation, Inc.
Salt Lake City, Utah

[54] PAL COMPATIBLE COLOR TELEVISION SYNCHRONIZATION GENERATOR
10 Claims, 4 Drawing Figs.

[52] U.S. Cl. 178/69.5
[51] Int. Cl. H04l 7/00
[50] Field of Search 178/5.4 (D), 69.5 (G), 69.5 (TU), 69.5 (CB), 5.45 (PNC)

[56] References Cited
UNITED STATES PATENTS
2,748,188 5/1956 Stahl et al. 178/69.5G

*Primary Examiner*—Robert L. Griffin
*Assistant Examiner*—Donald E. Stout
*Attorney*—Lynn G. Foster

ABSTRACT: Color television synchronizing systems, including method and apparatus for generating timing signals compatible with the phase alternate line (PAL) standard, the apparatus comprising a conventional CCIR or comparable synchronizing generator clocked by signals derived from a master oscillator and from which all synchronizing signals other than the color subcarrier are derived. The color subcarrier is derived from a slave oscillator, the output of which is correlated in frequency and phase, to comply with the PAL standard, with signals derived from the master oscillator by use of an automatic frequency control servo loop.

INVENTORS.
RONALD C. WARD
DANIEL C. PERRY
BY Lynn G. Foster
ATTORNEY

INVENTORS.
RONALD C. WARD
DANIEL C. PERRY

BY Lynn G. Foster
ATTORNEY

INVENTORS.
RONALD C. WARD
DANIEL C. PERRY
BY Lynn L. Foster
ATTORNEY

PAL COMPATIBLE COLOR TELEVISION SYNCHRONIZATION GENERATOR

FIELD OF INVENTION

The present invention relates to color television synchronization, and, more particularly, to a novel color television synchronizing generator and method which are particularly useful in creating the timing signals required for phase alternate line (PAL) television systems, widely used in European countries.

BACKGROUND

Although conceptually the PAL color standard is in some respects similar to NTSC (National Television Systems Committee) standard used in the United States, certain basic and important differences exist between the two standards. See Table 1, page 3. The most significant of the differences is that the color subcarrier output of the PAL standard has a "slip-phase" relationship with that of the horizontal timing signals. Because of the "slip-phase" requirement, extremely complicated and expensive circuitry is required for generating all of the signals of a PAL system, when compared to circuitry an NTSC generator.

As used herein, the phrase "slip-phase" is intended to mean an extremely precise and predictable phase and frequency correlation between sets of signals, such as the horizontal drive output and that from which the color subcarrier output is obtained, whereby the frequency difference between the two sets of signals is maintained constant and the cyclic variation in phase between the two sets of signals is a constant variation. In the PAL standard, succeeding identical transitions of all horizontal rate timing signals are separated by an interval exactly equal to time required to produce 283.75160 cycles of color subcarrier signal. The decimal excess (0.75160) is representative of 270.576° of one color subcarrier cycle. From this it can be seen that in comparing a selected point of the continuously occurring color subcarrier transitions with successive horizontal rate transitions, an advance in phase of 89.424° or a lag in phase of 270.576°is present. The fact that these relative phase positions are slightly removed from 90° and 270° respectively explains the existence of 2,500 distinct and separate relative positions which occur before the phase pattern repeats.

TABLE I

| | NTSC Standard | PAL Standard |
|---|---|---|
| Color subcarrier frequency | 3.579545 MHz | 4.43361875 MHz |
| Horizontal scanning frequency | 15734.26 Hz | 15625.0 Hz |
| Cycles of subcarrier per horizontal line | 227.5 | 283.75160 |
| Cycles of subcarrier to repeat phase | 455.0 | 709379.0 |
| No. of horiz. lines to repeat subcarrier phase | 2.0 | 2500.0 |
| Rate at which all standard signals repeat phase | 29.97002/Sec. | 6.25/Sec. |
| No. of horizontal lines per television frame | 525.0 | 625.0 |
| Vertical scanning frequency | 59.94005 HZ | 50 Hz |

Herebefore, to satisfy the "slip-phase" requirement, two basic approaches are believed to have been used. First, circuitry comprising a single clock oscillator and frequency dividing and frequency multiplying means together with a balanced modulator have been used to create both a color subcarrier output and a 2H signal, i.e. a signal having a frequency twice that of the horizontal drive output, the 2H signal being derived by use of the balanced modulator and communicated to a standard CCIR (Consultative Committee—International Radio) generator. The synchronizing signals, other than the color subcarrier, are derived from the 2H signal by or in conjunction with the CCIR generator.

Balanced modulators are well known in the art, being similar to those used in single sideband radio transmitting equipment and are known to be extremely critical and to require constant adjustment. The intended function of a balanced modulator used with prior art PAL generators is to provide a high degree of amplitude rejection to an unwanted frequency which is nearly equal to the wanted or selected frequency. However, the equipment has not successfully accomplished the intended function and is regarded as being fundamentally deficient.

Second, a technique sometimes referred to as frequency synthesis has been used. Here, expensive and complex circuitry, the number of stages and functions being dependent upon the chosen clock frequency is required. More specifically, a single clock oscillator is used, the signals of which are divided into two sets of signals. One set is processed through a series of dividing counters to produce the 2H signal which may be communicated to a standard CCIR generator. The color subcarrier is derived from the other set of signals following further frequency division, multiplication and mixing. Using this method, a plurality of mixing operations is required and a very high degree of rejection is needed at frequencies near the desired or wanted signal. Inexpensive systems of this type frequently fail to filter out all residual unwanted signals which has a very undesirable effect upon the system. Systems of this type which succeed in filtering out all residual unwanted signals are extremely complicated electronically and are very expensive to construct.

BRIEF SUMMARY AND OBJECTS OF THE INVENTION

The present invention, as typified by the disclosed and described FIGS. comprises a color television synchronizing generator and method particularly useful in creating the timing signals required for phase alternate line (PAL) television broadcasting. The novel portion of the color synchronizing generator comprises a master clock source of signals from which synchronizing outputs are obtained and a controlled clock source of signals from which the color subcarrier output is derived. A phase and frequency control circuit, interposed between the two clocks, generates a feed back signal to the controlled clock which maintains the desired frequency and phase relation between signals derived from one source and signals derived from the other source.

It is, therefore, a primary object of the present invention to provide novel method and apparatus for color television synchronization.

Another important object of the present invention is to provide an improved color synchronizing generator and method for creating timing signals required for PAL standard television origination.

It is another significant object of the present invention to provide a method and system for electronically generating a color subcarrier signal of proper frequency and phase relationship with respect to other established timing pulses of a television system according to the PAL standard.

Another paramount object of this invention is the provision of a synchronization system for PAL standard television which does not use the relatively unstable and unreliable frequency multipliers.

Another dominant object of the present invention is the elimination of the need for expensive and critical band-pass filters and balanced modulators in a synchronizing system for deriving phase-correlated PAL standard signals.

It is another important object of this invention to eliminate the need for complex circuitry based on frequency synthesis for television synchronization.

These and other objects and features of the present invention will become more fully apparent from the following description and appended claims taken in conjunction with the accompanying drawings wherein:

BRIEF DESCRIPTION OF THE FIGS.

DETAILED DESCRIPTION

General

Reference is now made in detail to the FIGS. wherein like numerals are used to designate like parts throughout. Inasmuch as certain portions of the synchronizing systems shown in FIGS. 1, 2 and 4 comprise identical components, these components will now be described.

Figure 1:
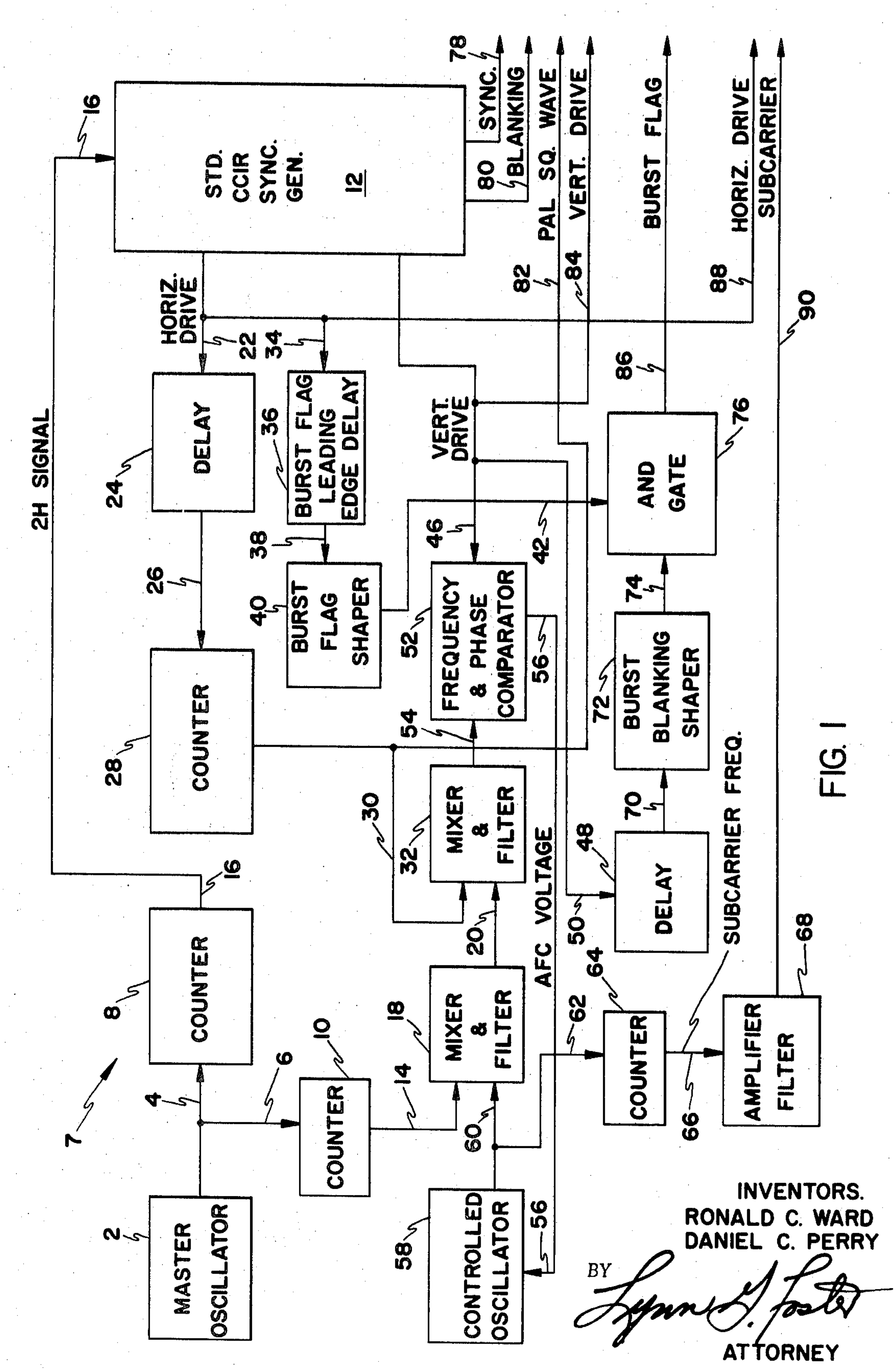
FIG. 1 is a block diagram of a color television synchronizing system embodying therein the present invention.
Figure 2:
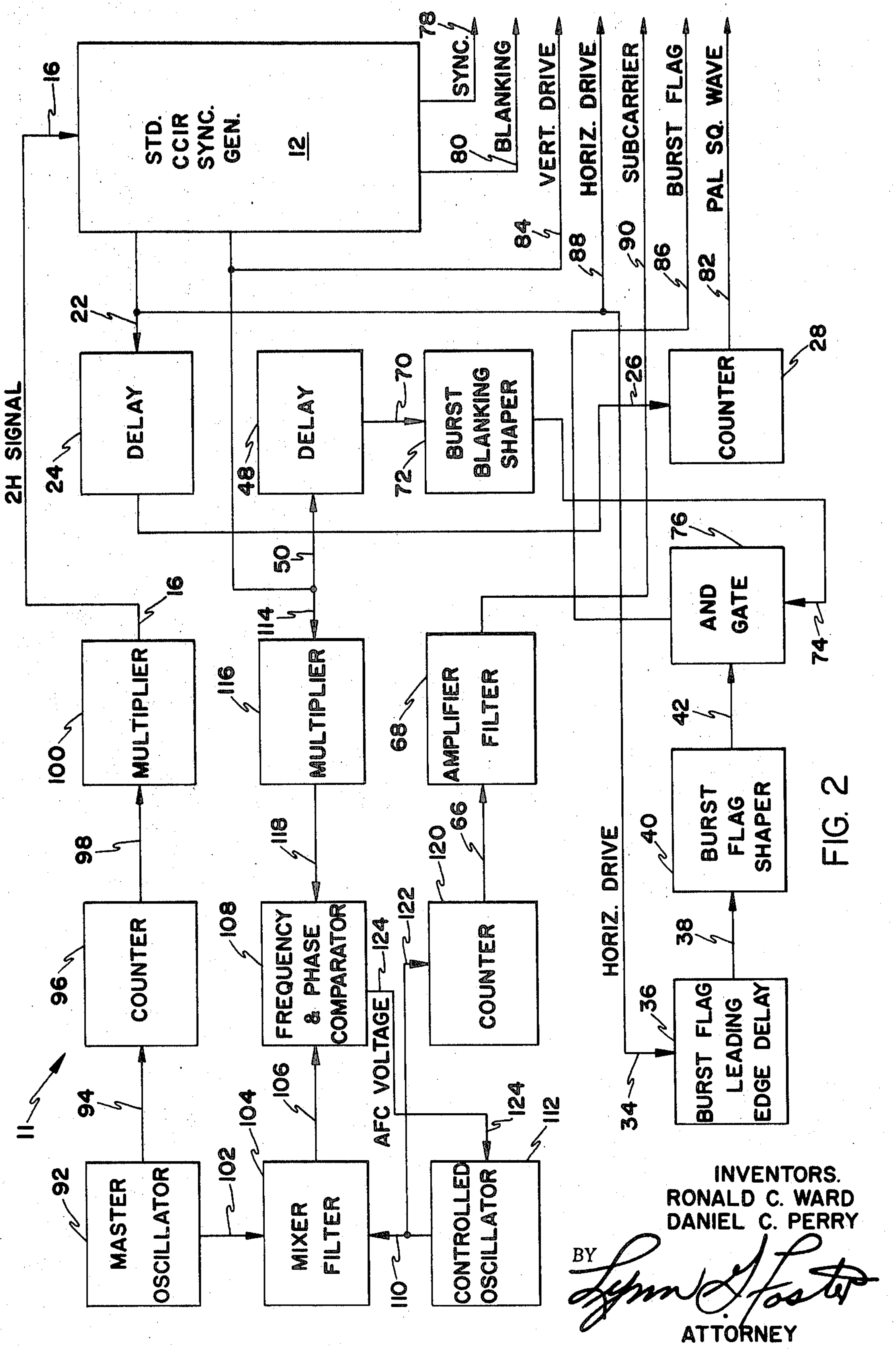
FIG. 2 is a block diagram of another presently preferred color television synchronizing system also including the present invention therein.
Figure 4:
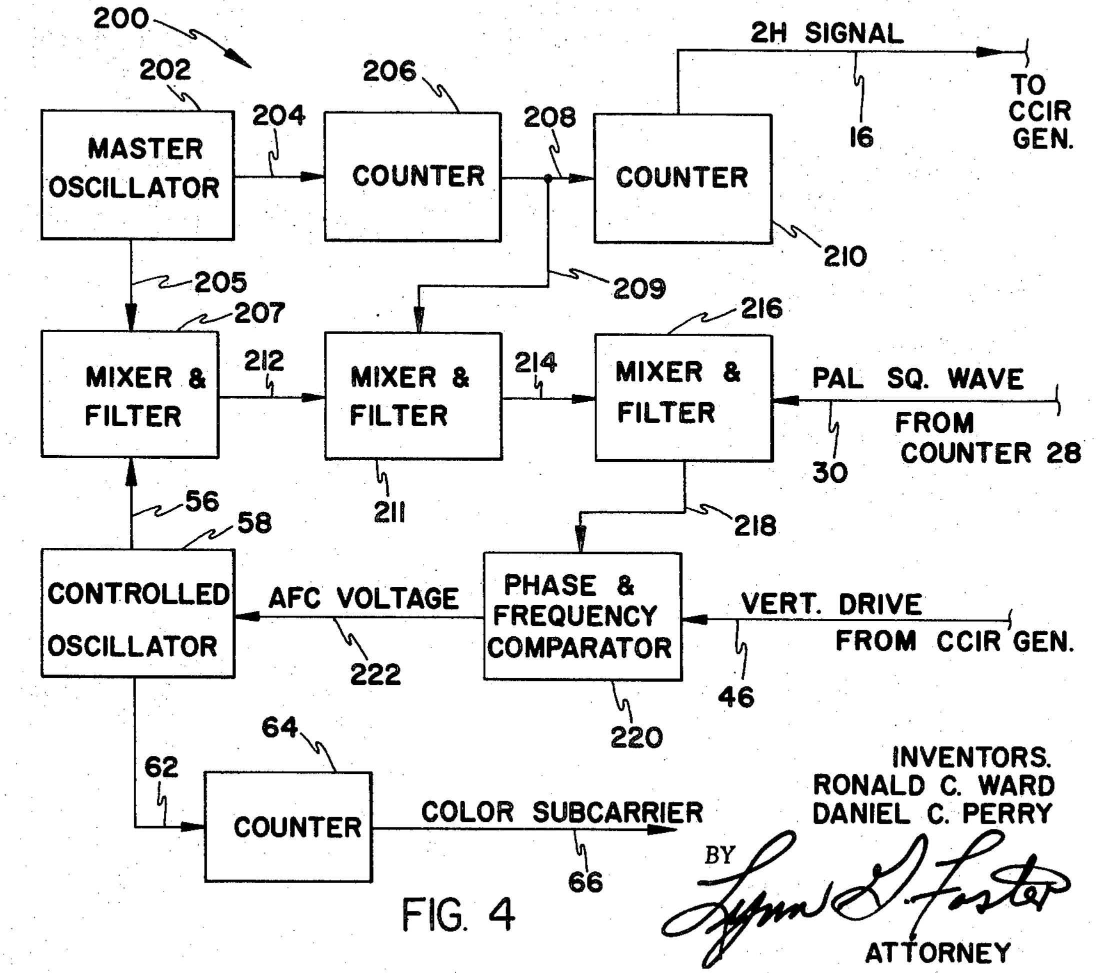
FIG. 4 is a block diagram of a modified color television synchronizing system according to the present invention, with some parts common to the FIGS. 1 and 2 not shown for purposes of brevity.

The PAL color television synchronizing system 7 of FIG. 1, the PAL color television synchronizing system 11 of FIG. 2 and the PAL color television synchronizing system 200 of FIG. 4 each comprise a standard CCIR or comparable generator 12 which receives, at line 16, a 2H signal, i.e. a signal equal to twice the horizontal drive signal or 31,250 Hz. CCIR generators are well known in the art of generating synchronizing signals for monochrome television, and the generator 12 is, therefore, shown as a single block for simplicity. The CCIR generator 12, utilizing the 2H signal at 16, directly derives sync. output 78, blanking output 80, vertical drive output 84 and horizontal drive output 88.

The CCIR generator 12 also assists in developing the PAL square wave output at 82, the burst flag output at 86 and the color subcarrier output at 90.

In a well known manner, the horizontal drive output from CCIR generator 12 is tapped at 22 into delay line 24, the delayed output of which is communicated through line 26 to divide by two counter 28, such that the count occurs coincident with the leading edge of each delayed pulse. The output of counter 28 is the PAL square wave 82, which is alternatively positive and negative for successive horizontal timing pulses.

Also, the horizontal timing signal from the CCIR generator 12 is tapped through a line 34 to burst flag leading edge delay multivibrator 36, the delayed output of which at 38 is communicated to burst flag shaper multivibrator 40, which produces a pulse train that is corrected in timing and duration. The burst flag output at 86 is developed by communicating the corrected pulse train at 42 from the multivibrator 40 to AND gate 76, where it is blanked coincident with a second input at 74 from burst blanking shaper multivibrator 72. The input at the multivibrator 72 is formed by tapping the vertical drive output of the CCIR generator 12 at 50 into delay multivibrator 48 the delayed output of which is the input to multivibrator 72.

Having described those portions of synchronizing systems 7, 11 and 200 which are common to FIGS. 1, 2 and 4, and which are conventional, attention is turned to the apparatus for and methods of generating the color subcarrier 90 and the 2H clocking signal at 16 for the purpose of disclosing the three illustrated embodiments of the present invention.

Remainder of FIG. 1

In FIG. 1, a crystal-controlled master oscillator 2, of well known design, operates at a frequency of 17.718750 MHz. This master or reference oscillator provides the frequency stability for the entire system 7. The output signal from oscillator 2 is connected as an input signal at 4 to a divide by 567 counter 8. The operation and design of counter 8 and the other counters hereinafter referred to preferably correspond to the operation and design of the counters described in detail in assignee's copending U.S. Pat. application Ser. No. 848,142, filed Jul. 28, 1969, as a continuation of Ser. No. 677,286, filed Oct. 23, 1967, now abandoned. The frequency at the output of counter 8 is the 2H signal (31,250 Hz.), which is impressed as the input to generator 12 at 16 to clock the CCIR generator.

The 17.718750 MHz output signal from the master oscillator 2 is also simultaneously applied at 6 to a counter 10 which divides the signal by two to derive a 8.8593750 MHz. signal at 14.

A second oscillator 58 is used, the frequency and phase of which is controlled by an AFC (Automatic Frequency Control) servo loop. The oscillator 58 may be of the type commonly referred to as VCO (Voltage Control Oscillator). The operating frequency of the oscillator 58 is dependent upon a feedback servo control voltage applied at input 56.

The frequency of the oscillator 58 is held at exactly 8.8672375 MHz. This output signal is applied at 62 as an input to counter 64 which divides the frequency by two to yield a 4.43361875 MHz. counter output at 66. The signal at 66 is a square wave in nature, consisting of the fundamental frequency and numerous harmonics. This signal is amplified and filtered at amplifier-filter 68 to reduce the harmonic content of the square wave signal, thus producing a fundamental sine wave comprising the subcarrier 90.

The output of the AFC oscillator 58 is also simultaneously applied at 60 to a mixer and filter 18 of the servo loop. As mentioned earlier, the 8.8593750 MHz. signal derived from the master oscillator 2 through counter 10 is also applied as an input at 14 to the mixer and filter 18.

Figure 3:
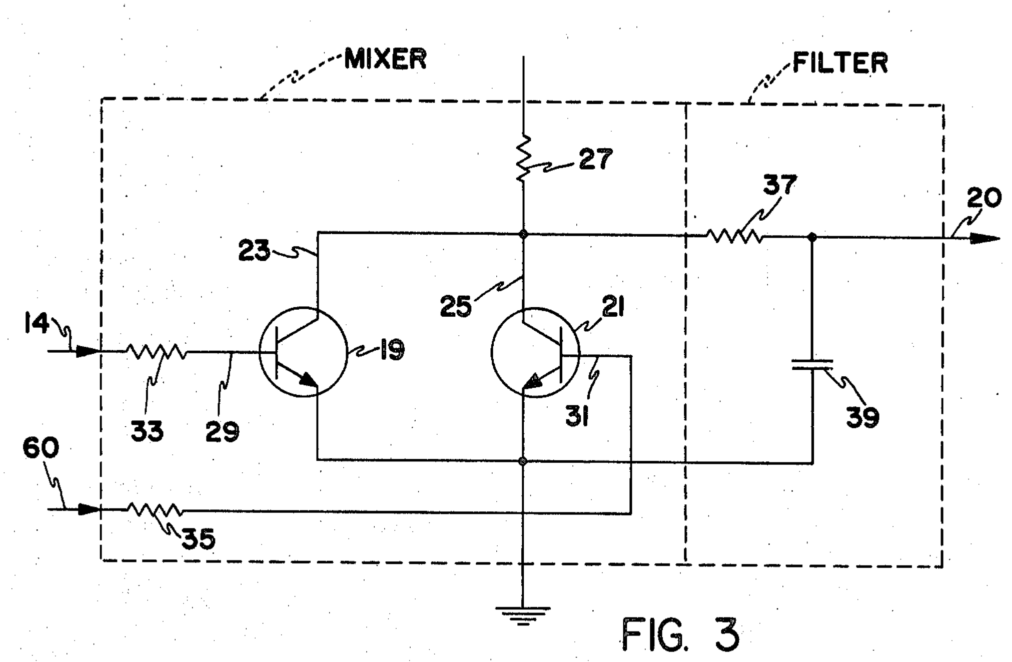
FIG. 3 is a circuit diagram of a presently preferred mixer and filter.

The unit 18 is of a type which is not complex and does not require critical adjustment. Briefly, with reference to FIG. 3, the preferred circuitry of the mixer consists of two transistors 19 and 21 wherein collector electrodes 23 and 25 of each are connected together sharing a common load resistor 27 and operating in a common emitter configuration. The input signals respectively traverse resistors 33 and 35 and base electrodes 29 and 31 of the transistors and are thus mixed to produce four frequencies consisting of the original two input signals, the sum of the two input signals and the difference of the two input signals. It is the difference signal which is desired as an output from mixer and filter 18. The separation of the desired difference frequency signal from the other, unwanted signals is preferably accomplished by using a simple resistance-capacitance filter comprising resistor 37 and capacitor 39 within the unit 18, since all unwanted signals are greatly removed in frequency from the desired signal. The difference frequency signal is 7.8625 kHz. which is approximately one hundred times lower than the nearest unwanted signal of the mixer of unit 18.

With reference again to FIG. 1, the 7.8625 kHz. signal is applied to another mixer-filter 32 at input 20. The mixer-filter 32 is similar in design and identical in function to the mixer-filter 18. A second input at 30 to the mixer-filter 32 is a 7,812.5 Hz. signal tapped from the standard PAL square wave output 82, which is one-half of the horizontal drive output 88. The filtered output of the mixer-filter 32 is 50 Hz., which is, as before, about 100 times less than nearest unwanted signal produced by the mixer-filter 32.

The 50 Hz. output signal from mixer-filter 32 is applied at 54 as an input to a frequency and phase comparator circuit 52. The frequency and phase comparator circuit 52 is preferably of a design of the type disclosed in detail in assignee's copending U.S. Pat. application Ser. No. 848,142-B.

In operation, the frequency and phase comparator circuit 52 receives the previously mentioned 50 Hz. input signal at 54 as well as a 50 Hz. input signal at 46, which is tapped from the vertical drive signal of the CCIR generator 12. If the 50 Hz. input signal at 54 occurs earlier in time with respect to the vertical drive 50 Hz. signal at 46, the result will be an increase in voltage at the comparator output 56. Conversely, if the signal at 54 occurs phased later in time with respect to the input at 46 then a decrease in voltage will occur at comparator output 56. The voltage at 56 is communicated to he slave, voltage controlled oscillator 58 and any positive and negative changes in the voltage serve to correct any drift tendency oscillator 58 may exhibit.

It should be appreciated that the master oscillator 2 serves as a reference for obtaining the subcarrier output frequency 90. Any deviation in the subcarrier frequency will, accordingly, be due directly to frequency changes of the master oscillator 2. Specifically, if the slave oscillator 58 tends toward a change in frequency, as, for example, 1 Hz., the difference frequency furnished from mixer-filter 18 will increase 1 Hz. as will the difference frequency output of the mixer-filter 32. Accordingly, the resultant control voltage at output 56 of the frequency and phase comparator circuit 52 will change in a positive direction. This will decrease the frequency of the voltage controlled oscillator 58.

The AFC servo loop just described exhibits an extremely high gain, since, for example, a 1 Hz. change in subcarrier reflects a 1 Hz change in the 50 Hz. input signal at 54 to the comparator circuit 52. Thus, the slave oscillator 58 is rigidly locked to produce the correct PAL slip-phase relationship mentioned earlier.

Remainder of FIG. 2

The master oscillator 92 of FIG. 2 generates a 17.734375 MHz. signal which is communicated as an input at 94 to a counter 96, where the signal is divided by 1135. The 15,625 Hz. resultant signal is impressed as an input at 98 to multiplier 100 which multiplies the signal by two. In this way, the 2H (31,250 Hz.) CCIR generator input signal at 16 is derived from master oscillator 92. Likewise, throughout their specification all signals produced by or in conjunction with generator 12 are considered derived from the master oscillator.

The 17.734375 MHz. signal originated at master oscillator 92 is also utilized at 102 as an input to mixer-filter 104, which is similar in design and function to the previously mentioned mixer-filters.

A voltage-controlled oscillator 112 is also used, the frequency and phase of which is controlled by an AFC servo loop. In this instance, the chosen frequency originating at slave oscillator 112 is 17.734475 MHz. and is impressed at 110 as an input to the mixer-filter 104 and also at 122 to counter 120. The frequency of the input signal is divided by four in the counter 120 to produce a 4.43361875 MHz. signal which is communicated to amplifier-filter 68. The 4.43361875 MHz. signal is a square wave in nature the harmonics of which are reduced at amplifier-filter 68 to provide a fundamental sine wave consisting of the color subcarrier 90.

The output at 106 of the mixer-filter 104 consists of a difference frequency signal of 100 Hz., which is communicated as an input to the frequency and phase comparator circuit 108 which is of a design and operation similar to previously described comparator circuit 52.

The other input at 118 to comparator circuit 108 is derived from the master oscillator 92 through the CCIR generator 12 by tapping the vertical drive output 84 into multiplier 116 at 114. The signal is multiplied by two to produce a 100 Hz. input signal at 118 to comparator circuit 108.

As in the case of comparator circuit 52, any shift in the constantly changing phase correlation between the input signal at 106 and the input signal at 118 produces a corresponding change in the voltage output 124 of comparator circuit 108 which comprises the voltage control input to slave oscillator 112. Likewise, any change in frequency of either input signal to comparator circuit 108 produces a change in the output voltage at 124. In this way, the voltage-controlled oscillator 112 is rigidly locked to the reference oscillator 92 to produce the correct frequency and slip-phase relation.

Remainder of FIG. 4

Specific reference is now made to FIG. 4 which depicts in block diagram form another presently preferred color television synchronizing system, generally designated 200. The system 200 comprises components 16, 30, 46, 56, 58, 62, 64 and 66 herein before described. Accordingly, no further description of the indicated components need be made at this junction.

The master oscillator 202 of FIG. 4 generates a 9.0 MHz. signal which is communicated as an input at 204 to a counter 206, where the signal is divided by 72. The 125 kHz. resultant signal is impressed as an input at 208 to counter 210 which divides the signal by four. Thus, the output signal from counter 210 is the previously mentioned 2H signal delivered to the CCIR generator at 16.

The 9.0 MHz. signal originating at master oscillator 202 is also utilized at 205 as an input to mixer-filter 207, which is similar in design and function to the previously mentioned mixer-filters as are 211 and 216 of FIG. 4.

The voltage controlled oscillator 58, previously described, is also used, the frequency and phase of which is controlled by an AFC servo loop. The frequency originating at slave oscillator 58 is 8.8672375 MHz. and is impressed at 56 as an input to the mixer-filter 207 and also at 62 to the counter 64 from which the signal 66 is obtained.

The output at 212 from the mixer-filter 207 consists of a difference frequency signal of 132.7625 kHz. which is communicated as an input to the mixer-filter 211. A second input at 209 to the mixer-filter 211 is a 125 kHz. signal tapped from line 208. The difference frequency filtered output of the mixer-filter 211 is communicated at 214 to a third mixer-filter 216. This signal is 7762.5 Hz. A second input at 30 to the mixer-filter 216 is a 7812.5 Hz. tapped from the standard PAL square wave. The difference frequency filtered output of the mixer-filter 216 is 50 Hz. and is communicated as an input at 218 to a frequency and phase comparator circuit 222. The frequency and phase comparator circuit 52 is of similar design and operation of the heretofore described comparator circuits 52 and 108. As before a voltage signal at 222 communicates slight undesired variations in the frequency and phase relationship between the input signals at 218 and 46 at the comparator circuit 220, to the controlled oscillator 58. In this way, the slave oscillator 58 is rigidly locked to produce correct PAL slip-phase and frequency relationships.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

We claim:

1. In a synchronizing generator for color origination:

a master clock source of signals for producing a plurality of synchronizing signals other than color subcarrier;

a slave clock source of signals for producing the color subcarrier; and phase and frequency control circuitry comprising means receiving and subtracting signals derived from said sources to obtain signals having a frequency equal to the difference frequency between the subtracting signals, and means (a) receiving difference frequency signals and comparing the phase and frequency thereof with the phase and frequency of signals derived from the master clock and (b) issuing an output to the slave clock source to control the frequency and phase of the slave clock signals in correlation to the phase and frequency of signals derived from the master clock.

2. In a synchronizing generator of the type defined in claim 1 comprising means receiving and dividing the master clock signals to produce source-derived signals which are communicated to the subtracting means.

3. In a synchronizing generator of the type defined in claim 1 wherein the subtracting means also comprises frequency selective filter means for eliminating unwanted signals from the difference frequency signals.

4. In a synchronizing generator of the type defined in claim 1 wherein the subtracting means comprises a signal mixer.

5. In a synchronizing generator of the type defined in claim 1 wherein the subtracting means comprises two mixers, the first mixer producing a first difference frequency signal obtained by subtracting signals derived from the master clock source from signals derived from the slave clock source, the second mixer producing a second difference frequency signal obtained by subtracting the first difference frequency signal from another signal derived from the master clock, which second difference frequency signal is communicated to the comparing and issuing means.

6. In a synchronizing generator of the type defined in claim 1 wherein the slave clock comprises a voltage-controlled oscillator and the comparing and issuing means comprises means emitting a voltage output, any positive and negative changes in the voltage output representing phase and frequency drift corrections which are communicated to the voltage-controlled oscillator.

7. In a synchronizing generator of the type defined in claim 1 wherein the subtracting means comprises at least one mixer having semiconductor means wherein the derived difference signal is substantially removed in frequency spectrum from other signals in the mixer and frequency selective filter means for eliminating the other signals from the derived signal.

8. In a synchronizing generator of the type defined in claim 1 wherein the subtracting means comprises three mixers, the first mixer producing a first difference frequency signal obtained by subtracting signals derived from the master clock source from signals derived from the slave clock source, the second mixer producing a second difference frequency signal obtained by subtracting the first difference frequency signal from another signal derived from the master clock, the third mixer producing a third difference frequency signal obtained by subtracting the second difference frequency signal from still another signal derived from the master clock, which third difference frequency signal is communicated to comparing and issuing means.

9. Method of generating phase alternate line color synchronizing signals comprising a color subcarrier output and other synchronizing outputs so that the variation in the phase relation between the subcarrier output and at least one other synchronizing output for any frame is constant:

generating a stable and continuous pulse train at a first source, from which at least one other synchronizing output is derived;

generating another stable and continuous pulse train at a second source from which the color subcarrier output is derived;

continuously comparing the phase and frequency of (a) signals derived from the first source with (b) difference frequency signals obtained by mixing signals derived from the first source with signals derived from the second source;

continuously communicating a feedback signal to the second source representing the results of the phase and frequency comparison; and maintaining the frequency of the subcarrier and the frequency of the other synchronizing output in fixed time relation and controlling the phase variance of the subcarrier output in time with respect to the phase of the other synchronizing output, by varying the phase and frequency of signals issued from the second source in correspondence with each variation in the feedback signal.

10. A synchronizing generator for color television origination:

a master clock source of signals for producing a plurality of synchronizing signals other than color subcarrier;

a slave clock source of signals for producing the color subcarrier;

mixing circuitry receiving and mixing signals derived from the two clock sources to produce beat signals;

circuitry receiving and altering master clock signals to produce derived signals;

phase and frequency control circuitry;

means communicating the beat signals derived from the two clock sources to the phase and frequency control circuitry;

means communicating the derived signals to the phase and frequency control circuitry; and means communicating a control signal derived from the phase and frequency control circuitry to the slave clock source to coordinate the phase and frequency of the slave clock signals with the phase and frequency of signals derived from the master clock.